(12) United States Patent
Oh

(10) Patent No.: US 9,824,303 B2
(45) Date of Patent: Nov. 21, 2017

(54) IMAGE MATCHING METHOD USING FEATURE POINT MATCHING

(71) Applicant: HANWHA TECHWIN CO., LTD., Changwon-si (KR)

(72) Inventor: Jaeyoon Oh, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 101 days.

(21) Appl. No.: 14/529,875

(22) Filed: Oct. 31, 2014

(65) Prior Publication Data

US 2015/0154470 A1    Jun. 4, 2015

(30) Foreign Application Priority Data

Nov. 29, 2013  (KR) .......................... 10-2013-0147994

(51) Int. Cl.
*G06K 9/62*  (2006.01)

(52) U.S. Cl.
CPC ............ *G06K 9/629* (2013.01); *G06K 9/6211* (2013.01)

(58) Field of Classification Search
None
See application file for complete search history.

(56) References Cited

U.S. PATENT DOCUMENTS

| | | | | |
|---|---|---|---|---|
| 6,084,989 A * | 7/2000 | Eppler | .................. | G06T 7/0028 348/144 |
| 8,229,222 B1 * | 7/2012 | Silver | .................... | G06K 9/481 382/141 |
| 2009/0002475 A1 * | 1/2009 | Jelley | .................... | H04N 5/2256 348/14.01 |
| 2010/0310177 A1 * | 12/2010 | Xiong | .................. | G06K 9/6211 382/201 |
| 2012/0076409 A1 * | 3/2012 | Guo | ...................... | G06K 9/6212 382/173 |
| 2012/0148164 A1 | 6/2012 | Suk et al. | | |
| 2014/0118514 A1 * | 5/2014 | Wright | .................. | H04N 5/332 348/61 |

(Continued)

FOREIGN PATENT DOCUMENTS

| KR | 10-2005-0063991 A | 6/2005 |
|---|---|---|
| KR | 10-2010-0008886 A | 1/2010 |

(Continued)

*Primary Examiner* — Mark Roz
(74) *Attorney, Agent, or Firm* — Sughrue Mion, PLLC

(57) ABSTRACT

An image matching method includes: extracting a plurality of feature points from a reference image; selecting a first feature point from the feature points, and selecting a first reference search area comprising the first feature point; setting a first matching candidate search area corresponding to the first reference search area from a target image, and extracting a plurality of feature points from the first matching candidate search area; selecting a second feature point closest to the first feature point in the first reference search area, and selecting a first straight line connecting the first and second feature points; generating a plurality of segments from the feature points extracted from the first matching candidate search area; and determining a first matching straight line matching a length and an angle of the first straight line, from the segments generated from the feature points extracted from the first matching candidate search area.

11 Claims, 7 Drawing Sheets

(56) References Cited

U.S. PATENT DOCUMENTS

2014/0193068 A1* 7/2014 Harvill .................. H04N 1/387
  382/164

FOREIGN PATENT DOCUMENTS

| KR | 10-2011-0068153 A | 6/2011 |
| KR | 10-2012-0063858 A | 6/2012 |
| KR | 10-2013-0023903 A | 3/2013 |

* cited by examiner

IMAGE MATCHING METHOD USING FEATURE POINT MATCHING

CROSS-REFERENCE TO THE RELATED APPLICATION

This application claims priority from Korean Patent Application No. 10-2013-0147994, filed on Nov. 29, 2013, in the Korean Intellectual Property Office, the disclosure of which is incorporated herein in its entirety by reference.

BACKGROUND

1. Field

Methods and apparatuses consistent with exemplary embodiments relate to image matching.

2. Description of the Related Art

In medical fields, an image matching method using a multi-sensor has been used to match complementary image information obtained using computerized tomography (CT), magnetic resonance imaging (MRI), and positron emission tomography (PET), etc. In contrast, in surveillance and security fields, an object is recognized and tracked by matching images obtained from a visible light sensor, an infrared sensor, etc. which use different wavelength bands.

According to a related-art image matching method using a multi-sensor, various candidate feature points are selected to search for matching feature points between feature points of a visible image and feature points of a thermal image.

For this image matching method, image patches having a predetermined size for measuring similarity between candidate feature points of the visible image and candidate feature points of the thermal image are required, and many complex calculations are required to calculate similarity between the image patches. Also, memory capacity may increase and an input/output bandwidth with an external memory may increase in order to process the image patches.

SUMMARY

One or more exemplary embodiments of the inventive concept provide an image matching method, wherein images are matched by using coordinate information about a plurality of feature points, without using a patch image.

Various aspects of the exemplary embodiment will be set forth in part in the description which follows and, in part, will be apparent from the description, or may be learned by practice of the presented embodiments.

According to an aspect of an exemplary embodiment, there is provided an image matching method which may include: capturing, by an image capturing apparatus using a first sensor, a reference image; capturing, by the image capturing apparatus or another image capturing apparatus using a second sensor, a target image; selecting a first feature point from the reference image and selecting a first reference search area including the first feature point from the reference image; setting a first matching candidate search area corresponding to the first reference search area from the target image, and extracting a plurality of feature points from the first matching candidate search area; selecting a second feature point closest to the first feature point from the first reference search area, and selecting a first straight line connecting the first and second feature points; generating a plurality of segments between the feature points extracted from the first matching candidate search area; and determining a first matching straight line matching a length and an angle of the first straight line, from among the segments.

The image matching method may further include: selecting a second reference search area based on the second feature point forming the first straight line; setting a second matching candidate search area corresponding to the second reference search area from the target image, and extracting a plurality of feature points from the second matching candidate search area; selecting a third feature point closest to the second feature point from the second reference search area, and selecting a second straight line connecting the second and third feature points; and searching the second matching candidate search area for a second matching straight line corresponding to the second straight line.

The searching for the second matching straight line may include searching for the second matching straight line which satisfies a condition that an angle formed by the first and second straight lines and a length of the second straight line may be respectively the same as an angle formed by the first and second matching straight lines and a length of the second matching straight line.

The image matching method may further include, in order to search for the second matching straight line, generating a plurality of segments connecting a feature point, corresponding to the second feature point selected from the first reference search area, among feature points forming the first matching straight line and at least one another feature point among the plurality of feature points extracted from the second matching candidate search area, except a segment constituting the first matching straight line.

The second feature point may be a feature point closest to the first feature point in the first reference search area.

The angle of the first straight line may be an angle formed by the first straight line and a horizontal or vertical line passing the first feature point.

According to an aspect of another exemplary embodiment, there is provided an image matching method which may include: extracting a plurality of feature points from a reference image; selecting a first feature point from the feature points extracted from the reference image, and selecting a first reference search area comprising the first feature point; setting a first matching candidate search area corresponding to the first reference search area from a target image, and extracting a plurality of feature points from the first matching candidate search area; selecting a second feature point closest to the first feature point in the first reference search area, and selecting a first straight line connecting the first and second feature points; generating a plurality of segments from the feature points extracted from the first matching candidate search area; and determining a first matching straight line matching a length and an angle of the first straight line, from the segments generated from the feature points extracted from the first matching candidate search area.

According to an aspect of still another exemplary embodiment, there is provided a matching system for matching a reference image and a target image by using a geometric relationship. The matching system may include: a geometrical shape generator configured to extract a plurality of feature points from the reference image, select a reference search area comprising a predetermined feature point from among the extracted feature points, select a next feature point closest to the predetermined feature point, from among the feature points extracted from the reference image, in the reference search area, and generate a reference straight line connecting the predetermined feature point and the next feature point; a candidate generator configured to set a matching candidate search area corresponding to the reference search area from the target image, extract a plurality of feature points from the matching candidate search area, and generate a plurality of segments between the feature points extracted from the matching candidate search area; and a matcher configured to search the segments generated by the candidate generator for a matching straight line matching a length and an angle of the reference straight line from the segments generated between the feature points extracted from the matching candidate search area, wherein the geometrical shape generator is configured to update the reference search area based on the next feature point and select an additional straight line by selecting another feature point closest to the next feature point from the updated reference search area, and then the candidate generator is configured to newly set a matching candidate search area corresponding to the updated reference search area and select an additional matching straight line corresponding to the additional straight line from the newly set matching candidate search area.

According to an aspect of still another exemplary embodiment, there is provided a matching system for matching a reference image and a target image which may include: a geometric shape generator configured to extract a plurality of feature points from the reference image, select a reference search area comprising a predetermined feature point from among the extracted feature points, select a next feature point closest to the predetermined feature point from among the feature points and included in the reference search area, generate a reference straight line connecting the predetermined feature point and the next feature point, newly set the reference search area based on the next feature point, and generate an additional straight line by selecting a feature point closest to the next feature point; and a matcher configured to select a matching straight line corresponding to the reference straight line based on an angle and a length in the target image, and select an additional matching straight line, corresponding to the additional straight line, in the newly set reference search area.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
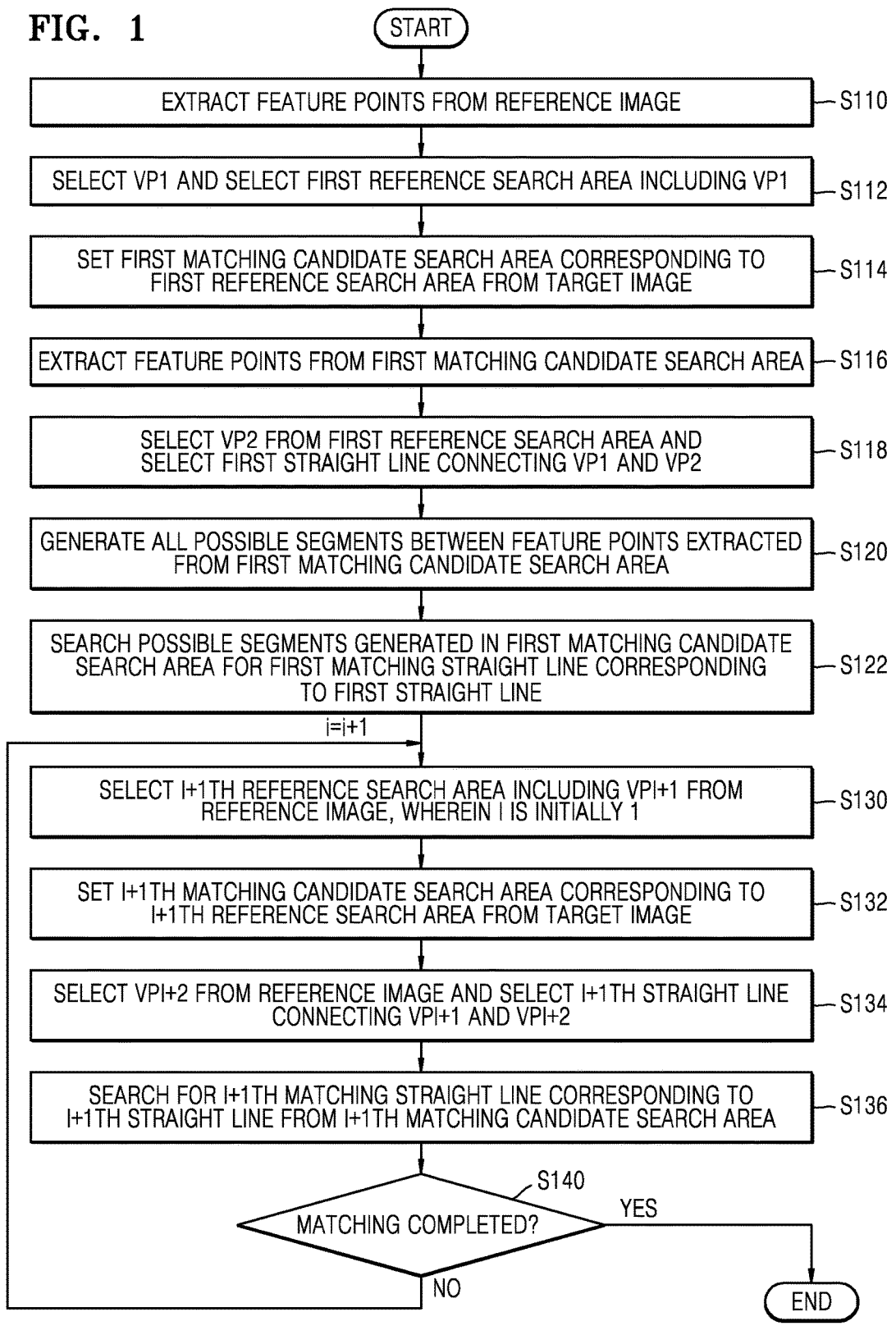
FIG. 1 is a flowchart illustrating an image matching method according to an exemplary embodiment.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain various aspects of the inventive concept.

FIG. 1 is a flowchart illustrating an image matching method according to an exemplary embodiment.

According to an exemplary embodiment, when a visible light camera and a thermal imaging camera, preferably but not necessarily, adjacent to the visible light camera photograph the same target, the image matching method uses a geometric relationship of feature points between a visible image captured by the visible light camera and a thermal image captured by the terminal imaging camera.

According to an exemplary embodiment, in order to perform image matching, feature points are extracted from a reference image captured by an image capturing apparatus using a first sensor, in operation S110. A first feature point VP1 is arbitrarily selected from the reference image and a first reference search area including the first feature point VP1 is selected, in operation S112, as will be described in detail later with reference to FIG. 2.

Then, a first matching candidate search area corresponding to the first reference search area is set from a target image captured by an image capturing apparatus using a second sensor, and feature points are extracted from the first matching candidate search area in operations S114 and S116, as will be described in detail later with reference to FIG. 3.

In operation S118, a second feature point VP2 closest to the first feature point VP1 is selected from the first reference search area, and then a first straight line connecting the first and second feature points VP1 and VP2 is selected, as will be described in detail later with reference to FIG. 4. Here, a straight line represents a shortest path between two distinct end points.

Then, all possible segments between the feature points extracted from the first matching candidate search area are generated in operation S120. For example, if the number of feature points extracted from the first matching candidate search area is N, the number of possible segments is N×(N−1). Operation S120 will be described in detail later with reference to FIG. 7.

Then, the all possible segments generated in the first matching candidate search area is searched for a first matching straight line matching a length and an angle of the first straight line connecting the first and second feature points VP1 and VP2 in the first reference search area, in operation S122.

If the first matching straight line is found, a second reference search area is selected based on the second feature point VP2 that is selected last from among the first and second feature points VP1 and VP2 forming the first straight line in the reference image, in operation S130. Then, a second matching candidate search area corresponding to the second reference search area is set from the target image captured by the image capturing apparatus using the second sensor, and feature points are extracted from the second matching candidate search area, in operation S132.

A third feature point VP3 closest to the second feature point VP2 is selected from the second reference search area, and then a second straight line connecting the second and third feature points VP2 and VP3 is selected, in operation S134. Then, a second matching straight line corresponding to the second straight line is searched for in the second matching candidate search area, in operation S136. Operations S134 and S136 will be described in detail later with reference to FIG. 8.

Then, operations S130 through S136 are repeatedly performed until a matched pair is found in the target image S140 to search for matching straight lines corresponding to third through $n^{th}$ straight lines, as will be described later with reference to FIG. 9.

According to another exemplary embodiment, the image matching method may be performed by using a geometric relationship between feature points of images after the same target is photographed by using the same or different types of sensors.

The image matching method according to an exemplary embodiment will now be described in detail with reference to FIGS. 2 through 9.

Figure 2:
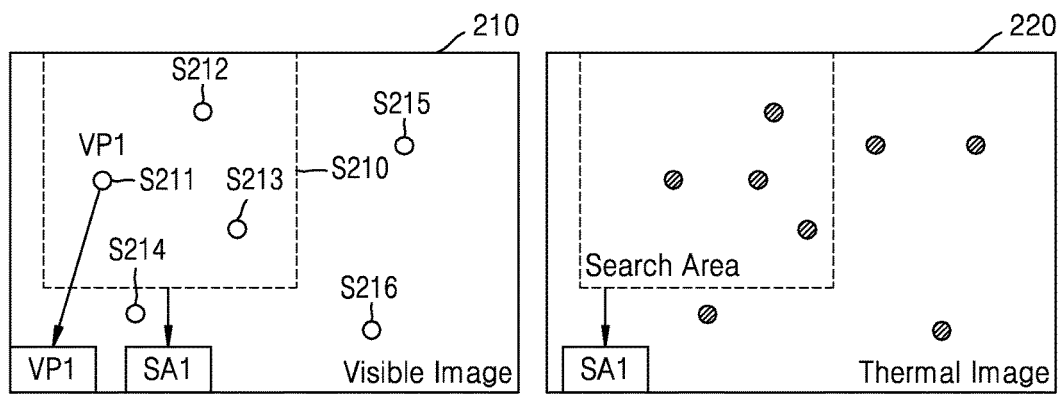
FIG. 2 is a diagram for describing a process of selecting a first feature point and a reference search area from a reference image during the image matching method, according to an exemplary embodiment.

FIG. 2 is a diagram for describing a process of selecting a first feature point VP1 S211 and a reference search area SA1 S210 from a reference image 210, according to an exemplary embodiment.

According to an exemplary embodiment, the reference image 210 may be captured by using an image capturing apparatus using a first sensor and a target image 220 may be captured by using an image capturing apparatus using a second sensor. According to an exemplary embodiment, the reference image 210 may be a visible image and the target image 220 may be a thermal image.

According to another exemplary embodiment, the reference image 210 and the target image 220 may be images obtained by photographing the same object by using the same type of sensors.

According to an exemplary embodiment, feature points S211 through S126 are extracted from the reference image 210. Then, an arbitrary feature point, for example, the first feature point VP1 S211, may be selected from the first through sixth feature points S211 through S216.

If the first feature point VP1 S211 is selected, the first reference search area SA1 S210 including the first feature point VP1 S211 is selected.

Figure 3:
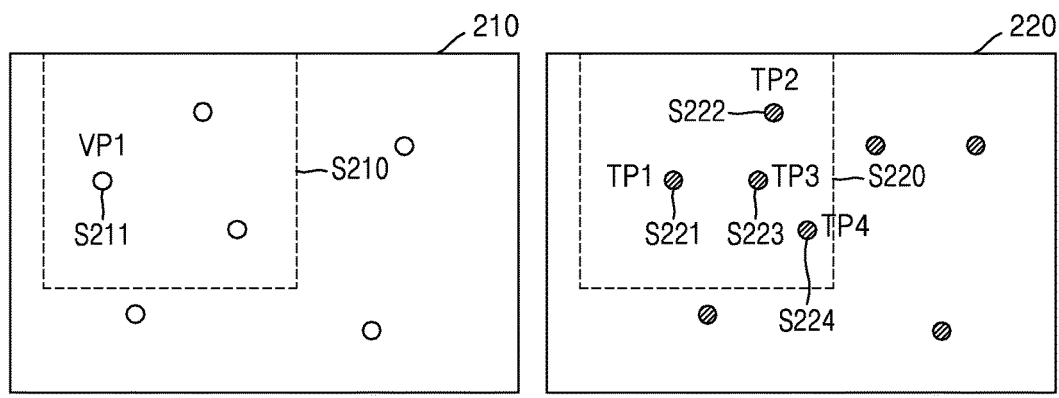
FIG. 3 is a diagram for describing a process of selecting feature points and a first matching candidate search area from a target image during the image matching method, according to an exemplary embodiment.

FIG. 3 is a diagram for describing a process of selecting feature points TP1 S211, TP1 S222, TP3 S223, and TP4 S224 and a first matching candidate search area S220 from the target image, according to an exemplary embodiment.

If the first feature point VP1 S211 and the first reference search area SA1 S210 are set from the reference image 210, the first matching candidate search area S220 corresponding to the first reference search area SA1 S210 is set from the target image 220.

If the first matching candidate search area S220 is set, the feature points TP1 S221 through TP4 S224 are extracted from the first matching candidate search area S220.

Figure 4:
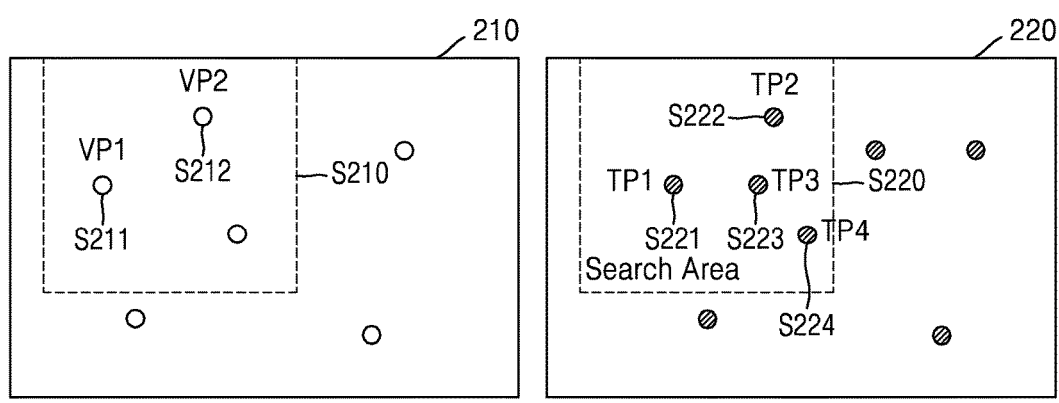
FIG. 4 is a diagram for describing a process of selecting a second feature point from the reference search area in the reference image during the image matching method, according to an exemplary embodiment.

FIG. 4 is a diagram for describing a process of selecting a second feature point VP2 S212 from the first reference search area SA1 S210 in the reference image 210, according to an embodiment.

If the first feature point VP1 S211 and the first reference search area SA1 S210 are set from the reference image 210, and the feature points TP1 S221 through TP4 S224 are extracted from the first matching candidate search area S220 of the target image 220, the second feature point VP2 S212 closest to the first feature point VP1 S211 is selected from the first reference search area SA1 S210.

$$VP2(S212)=\mathrm{MinDistance}(VP1)(S211)$$

Figure 5:
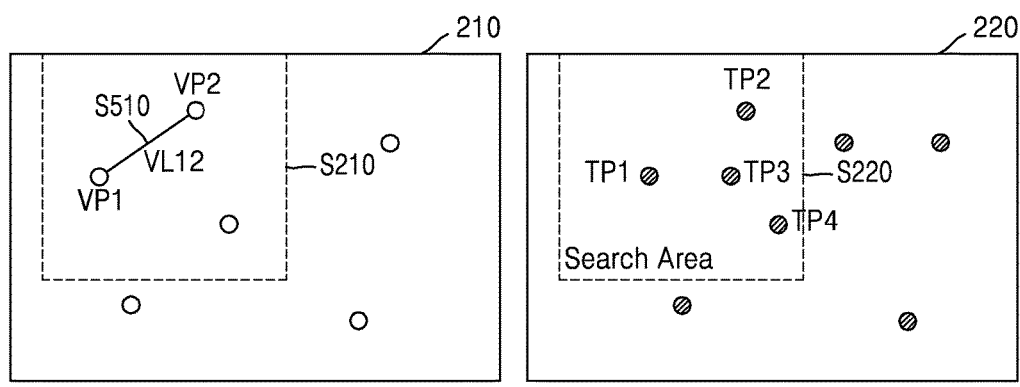
FIG. 5 is a diagram for describing a process of selecting a first straight line from the reference search area in the reference image, according to an exemplary embodiment.

FIG. 5 is a diagram for describing a process of selecting a first straight line VL12 S510 from the first reference search area SA1 S210 in the reference image 210, according to an exemplary embodiment.

If the first feature point VP1 S211 and the second feature point VP2 S212 are selected from the first reference search area SA1 S210 of the reference image 210, the first straight line VL12 S510 connecting the first feature point VP1 S211 and the second feature point VP2 S212 is selected.

Figure 7:
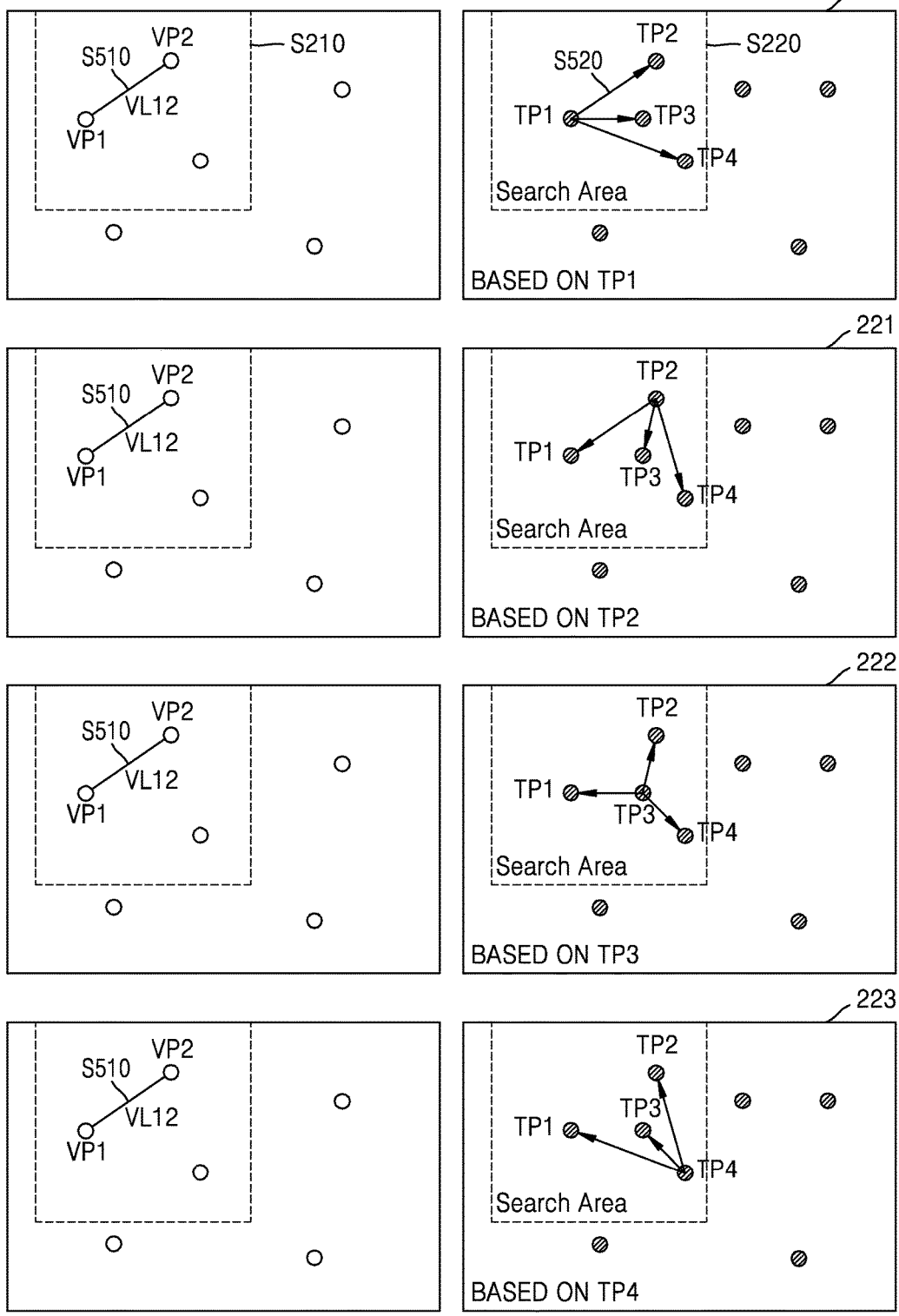

Then, all possible segments are generated based on the feature points TP1 S221 through TP4 S224 extracted from the first matching candidate search area S220 of the target image 220 (refer to target images 220 through 223 of FIG. 7).

For example, if the number of feature points extracted from the first matching candidate search area S220 is n, the number of possible segments is n×(n−1). In FIG. 5, the number of all possible segments generated based on the feature points TP1 S221 through TP4 S224 extracted from the first matching candidate search area S220 is 4×3=12.

Figure 6:
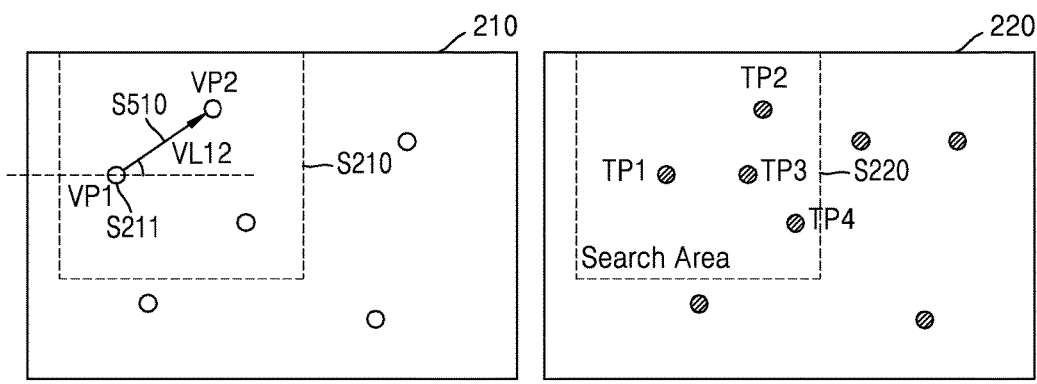
FIGS. 6 and 7 are diagrams for describing a process of searching the first matching candidate search area for a matching straight line corresponding to the first straight line of the reference search area, according to an exemplary embodiment.

FIGS. 6 and 7 are diagrams for describing a process of searching the first matching candidate search area S220 for a matching straight line corresponding to the first straight line V12 S510 of the first reference search area SA1 S210, according to an exemplary embodiment.

Referring to FIG. 6, it is determined whether a segment corresponding to the first straight line VL12 S510 in the first reference search area SA1 S210 of the reference image 210 exists in the 12 possible segments between the feature points TP1 S221 through TP4 S224 extracted from the first matching candidate search area S220.

In order to search the target image 220 for the straight line matching the first straight line VL12 S510 in the reference image 210, an angle and a length of the first straight line VL12 S510 are used. The angle of the first straight line VL12 S510 is an angle formed by the first straight line VL12 S510 and a horizontal line passing the first feature point VP1 S211.

As shown in FIG. 7, a first matching straight line S520 matching the first feature point VP1 S211 is searched for.

Figure 8:
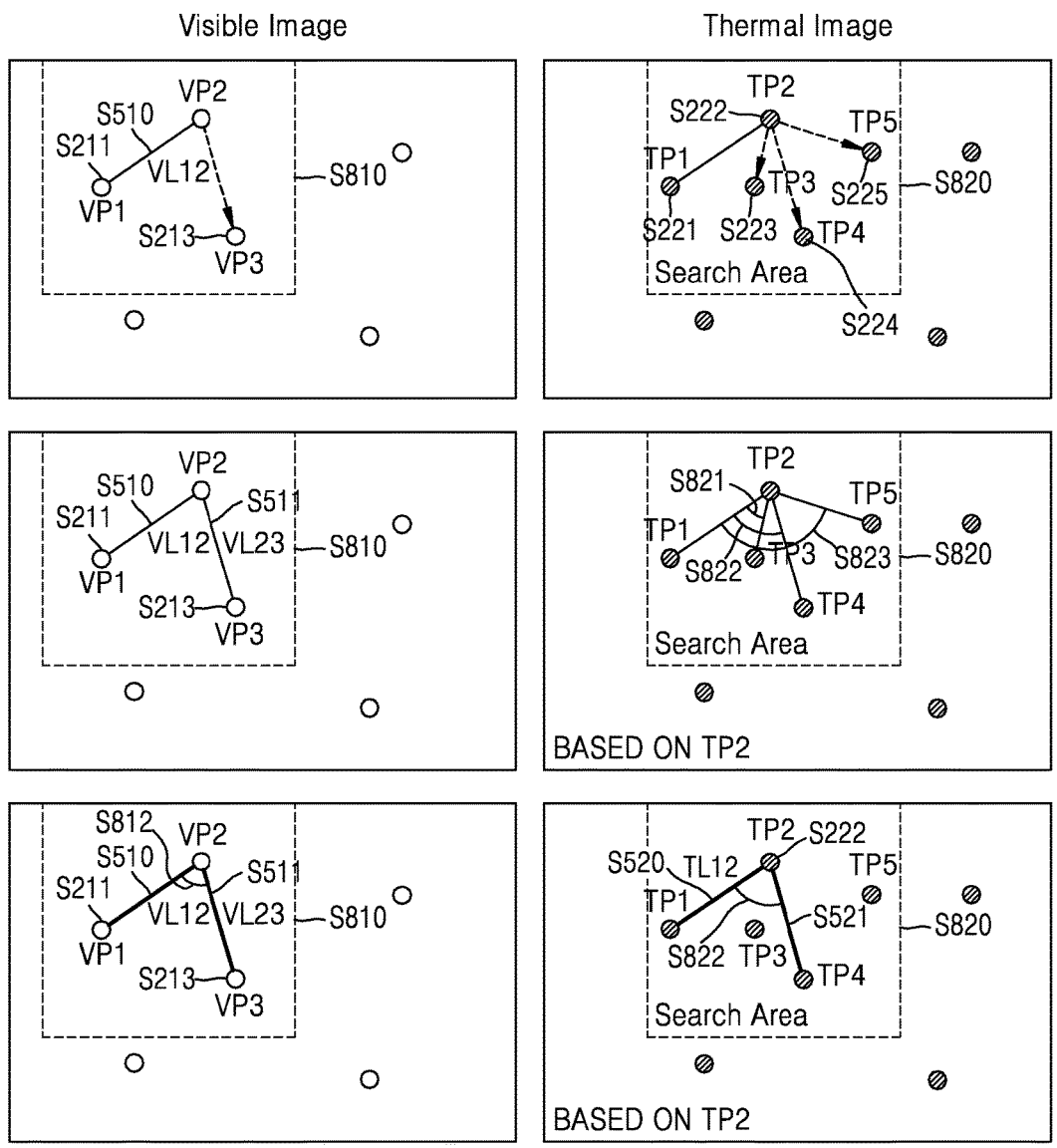
FIG. 8 is a diagram for describing a process of selecting a second straight line from the reference search area of the reference image, and searching the first matching candidate search area for a matching straight line corresponding to the second straight line, according to an exemplary embodiment.

FIG. 8 is a diagram for describing a process of selecting a second straight line VL23 S511 from a second reference search area S810 of the reference image 210, and searching the first matching candidate search area S220 for a matching straight line corresponding to the second straight line VL23 S511, according to an exemplary embodiment.

After the first matching straight line S520 matching the first straight line VL12 S510 of the reference image 210 is found in the target image 220 through the processes described above with reference to FIGS. 2 through 7, the second reference search area S810 is newly set based on the second feature point VP2 S212 that is selected last from among the first and second feature points VP1 S211 and VP2 S212 forming the first straight line VL12 S510. The second reference search area S810 may be set to be the same as or different from the first reference search area SA1 S210.

Then, a third feature point VP3 S213 closest to the second feature point VP2 S212 is selected from the second reference search area S810 of the reference image 210, and the second straight line VL23 S511 connecting the second feature point VP2 S212 and the third feature point VP3 S213 is generated.

A second matching candidate search area S820 corresponding to the second reference search area S810 is selected from the target image 220, and feature points are extracted from the second matching candidate search area S820. The second matching candidate search area S820 may be set to be the same as or different from the first matching candidate search area S220. When the second matching candidate search area S820 is set to be the same as the first matching candidate search area S220, a process of extracting the feature points from the second matching candidate search area S820 may not be performed.

Then, the second matching candidate search area S820 is searched for a second matching straight line S521 corresponding to the second straight line VL23 of the second reference search area S810.

In this case, unlike when the first matching straight line S520 is searched for, only feature points forming a straight line with the feature point TP2 S222 that is selected last from among the feature points TP1 S221 and TP2 S222 forming the first matching straight line S520 are compared.

Referring to FIG. 8, candidates for the second matching straight line S521 corresponding to the second straight line VL23 S511 are a segment connecting the feature points TP2 S222 and TP3 S223, a segment connecting the feature points TP2 S222 and TP4 S224, and a segment connecting the feature points TP2 S222 and TP5 S225.

In other words, the candidates for the second matching straight line S521 are the three segments.

The second matching straight line S521 matching the second straight line VL23 is searched for based on an angle S812 formed by the first straight line VL12 S510 and the second straight line VL23 S511, and a length of the second straight line VL23 S511.

For example, angles between the first matching straight line S520, and the segment connecting the feature points TP2 S222 and TP3 S223, the segment connecting the feature points TP2 S222 and TP4 S224, and the segment connecting the feature points TP2 S222 and TP5 S225, which are the candidates for the second matching straight line S521, are compared to the angle S812.

Then, lengths of the segment connecting the feature points TP2 S222 and TP3 S223, the segment connecting the feature points TP2 S222 and TP4 S224, and the segment connecting the feature points TP2 S222 and TP5 S225, which are the candidates for the second matching straight line S521, are compared to the length of the second straight line VL23 S511.

Then, the second matching straight line S521 matching the angle S812 and the length of the second straight line S511 is selected.

Figure 9:
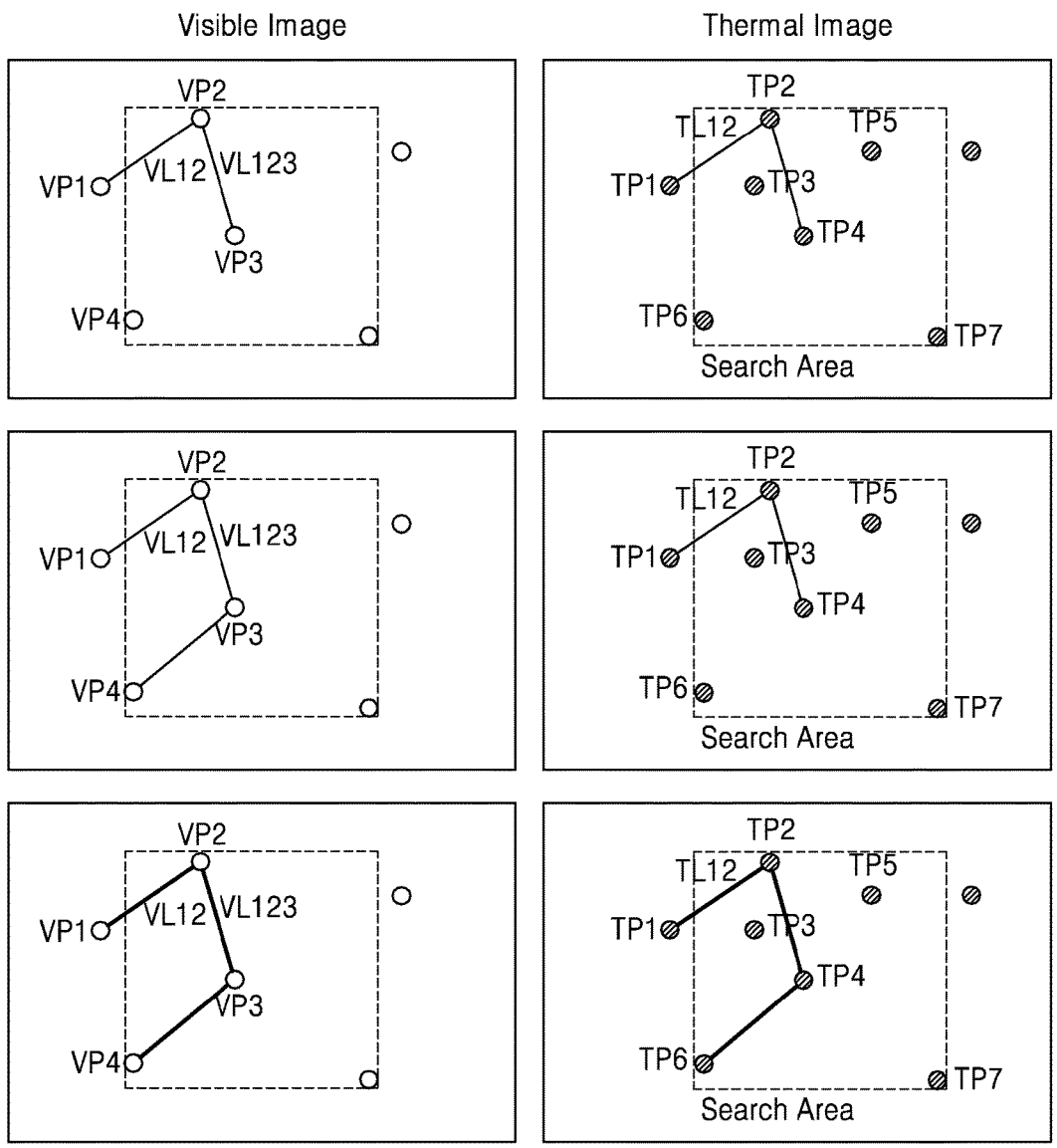
FIG. 9 is a diagram for describing a process of selecting a third straight line from the reference search area of the reference image, and searching the first matching candidate search area for a straight line corresponding to the third straight line during the image matching method, according to an exemplary embodiment.

Then, the image matching method is continuously performed as shown in FIG. 9 in the similar manner described above with reference to FIG. 8.

Figure 10:
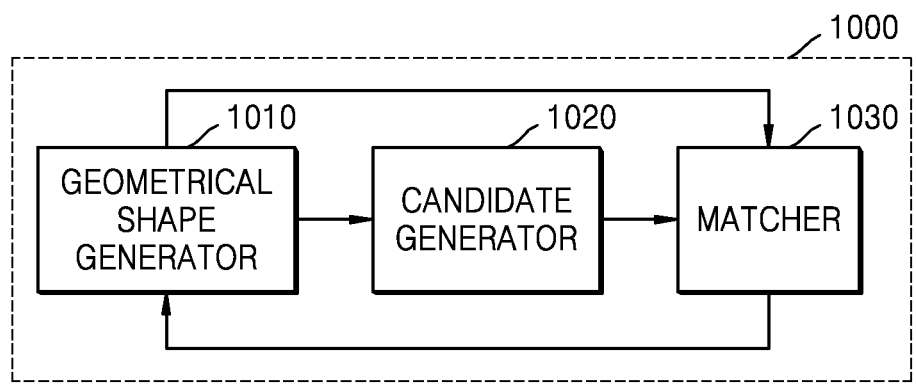
FIG. 10 is a block diagram of a matching system that matches a reference image and a target image by using a geometric relationship between feature points, according to an exemplary embodiment.

FIG. 10 is a block diagram of a matching system 1000 that matches a reference image and a target image by using a geometric relationship between feature points, according to an embodiment.

The matching system 1000 includes a geometrical shape generator 1010, a candidate generator 1020, and a matcher 1030.

The geometrical shape generator 1010 extracts feature points from the reference image, and selects a reference search area including a predetermined feature point from among the extracted feature points. Then, the geometrical shape generator 1010 selects a next feature point closest to the predetermined feature point from the reference search area, and generates a reference straight line connecting the predetermined feature point and the next feature point.

Referring to FIGS. 2 and 5, the geometrical shape generator 1010 selects the first reference search area SA1 S210 including the first feature point VP1 S211. Then, the second feature point VP2 S212 closest to the first feature point VP1 S211 is selected from the first reference search area SA1 S210. For convenience of description, the predetermined feature point is referred to as the first feature point VP1 S211, the next feature point closest to the predetermined feature point is referred to as the second feature point VP2 S212, and the reference search area including the predetermined feature point is referred to as the first reference search area SA1 S210.

Then, a reference straight line, i.e., the first straight line VL12 S510, is selected by connecting the first feature point VP1 S211 and the second feature point VP2 S212.

In FIG. 10, the matching system 1000 is illustrated to include the three different structures of the geometrical shape generator 1010, the candidate generator 1020, and the matcher 1030 which perform the above-described functions, respectively. According to another exemplary embodiment, however, any two or all of the three structures may be combined to constitute only two structures or one single structure which performs all of the functions described above.

Referring to FIG. 7, the candidate generator 1020 sets the first matching candidate search area S220 corresponding to the first reference search area S210 from the target image 220, extracts the feature points TP1 S221 through TP4 S224 from the first matching candidate search area S220, and generates all possible segments between the extracted feature points TP1 S221 through TP4 S224.

The matcher 1030 searches for the first matching straight line S520 matching the length and the angle of the first straight line VL12 S510 from among the all possible segments generated by the candidate generator 1020.

Referring to FIG. 8, the geometrical shape generator 1010 then updates the reference search area to obtain the second reference search area S810, based on the second feature point VP2 S212 that is selected last from among the first and second feature points VP1 S211 and VP2 S212 forming the first straight line VL12.

Next, an additional straight line, i.e., the second straight line VL23 S511, is selected by selecting the third feature point VP3 S213 closest to the second feature point VP2 S212 from the second reference search area S810.

In this case, the candidate generator 1020 newly sets a matching candidate search area, i.e., the second matching candidate search area S820, corresponding to the second reference search area S810, and selects an additional matching straight line, i.e., the second matching straight line S521 corresponding to the second straight line VL23 S511 from the second matching candidate search area S820. In order to search for the additional matching straight line, the candidate generator 1020 may generate possible segments, wherein one end point of each of the possible segments is a last selected feature point of the matching straight line and the other end point of each of the possible segments is one of feature points that lie in the newly set matching candidate search area.

As described above, according to the above exemplary embodiments, since a patch image is not used during an image matching method, the number of complex operations may be reduced.

Also, according to the above exemplary embodiments, since images are matched based on coordinate information of feature points, the number of unnecessary operations may be reduced and performance may be increased.

The inventive concept can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

At least one of the components, elements or units represented by a block as illustrated in FIG. 10 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a CPU that performs the respective functions, a microprocessor, or the like. Further, although a bus is not illustrated in FIG. 10, communication between the components, elements or units may be performed through the bus.

It should be understood that the exemplary embodiments described above should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. An image matching method for matching at least two images, the image matching method comprising:
    extracting a plurality of feature points from a reference image;
    selecting a first feature point from the feature points extracted from the reference image, and selecting a first reference search area comprising the first feature point;
    setting a first matching candidate search area corresponding to the first reference search area from a target image, and extracting a plurality of feature points from the first matching candidate search area;
    selecting a second feature point closest to the first feature point in the first reference search area, and selecting a first straight line connecting the first and second feature points;
    generating a plurality of line segments, each connecting two feature points among the plurality of feature points extracted from the first matching candidate search area, wherein if a number of the plurality of feature points extracted from the first matching candidate search area is N, a number of the line segments generated from the plurality of feature points extracted from the first matching candidate search area is N×(N−1);
    comparing the first straight line with each of the N×(N−1) number of the line segments generated from the plurality of feature points extracted from the first matching candidate search area;
    determining, based on a result of the comparing the first straight line with each of the N×(N−1) number of the line segments, a first matching straight line of which a length and an angle, with respect to a horizontal line of the target image, match a length and an angle, with respect to a horizontal line of the reference image, of the first straight line, from the N×(N−1) number of the line segments generated from the plurality of feature points extracted from the first matching candidate search area;
    selecting a second reference search area based on the second feature point forming the first straight line;
    setting a second matching candidate search area corresponding to the second reference search area from the target image, and extracting a plurality of feature points from the second matching candidate search area;
    selecting a third feature point closest to the second feature point in the second reference search area, and selecting a second straight line connecting the second and third feature points;
    searching the second matching candidate search area for a second matching straight line corresponding to the second straight line; and
    matching the reference image to the target image based on the first straight line, the first matching straight line, the second straight line, and the second matching straight line, and outputting a result of the matching.

2. The image matching method of claim 1, wherein the second reference search area is the same as or different from the first reference search area, and the second matching candidate search area is the same as or different from the first matching candidate search area, and
    wherein if the second reference search area is the same as the first reference search area, and the second matching candidate search area is the same as the first matching candidate search area, the plurality of feature points extracted from the second matching candidate search area are the same as the plurality of feature points extracted from the first matching candidate search area.

3. The image matching method of claim 1, wherein the searching for the second matching straight line comprises searching for the second matching straight line which satisfies an angle formed by the first and second straight lines and a length of the second straight line are respectively the same as an angle formed by the first and second matching straight lines and a length of the second matching straight line.

4. The image matching method of claim 1, further comprising, in order to search for the second matching straight line, generating a plurality of line segments connecting a feature point, corresponding to the second feature point selected from the first reference search area, among feature points forming the first matching straight line and at least one another feature point among the plurality of feature points extracted from the second matching candidate search area, except a line segment constituting the first matching straight line.

5. A matching system for matching a reference image and a target image by using a geometric relationship, the matching system comprising at least one hardware processor to implement:
- a geometrical shape generator configured to extract a plurality of feature points from the reference image, select a reference search area comprising a first feature point from among the extracted feature points, select a second feature point closest to the predetermined feature point, from among the feature points extracted from the reference image, in the reference search area, and generate a reference straight line connecting the first feature point and the second feature point;
- a candidate generator configured to set a matching candidate search area corresponding to the reference search area from the target image, extract a plurality of feature points from the matching candidate search area, and generate a plurality of line segments, each connecting two feature points among the plurality of feature points extracted from the matching candidate search area, wherein if a number of the plurality of feature points extracted from the matching candidate search area is N, a number of the line segments generated from the plurality of feature points extracted from the matching candidate search area is N×(N−1); and
- a matcher configured to compare the reference straight line with each of the N×(N−1) number of the line segments generated from the plurality of feature points extracted from the matching candidate search area, and determine, based on a result of the comparing the reference straight line with each of the N×(N−1) number of the line segments, a matching straight line of which a length and an angle, with respect to a horizontal line of the target image, match a length and an angle, with respect to a horizontal line of the reference image of the reference straight line, from the N×(N−1) number of the line segments generated from the plurality of feature points extracted from the matching candidate search area, wherein the geometrical shape generator is configured to update the reference search area based on the second feature point and select a second straight line connecting the second feature point and a third feature point, which is closest to the second feature point in the updated reference search area, and then the candidate generator is configured to newly set a second matching candidate search area corresponding to the updated reference search area and select a second matching straight line corresponding to the second straight line from the second matching candidate search area, wherein the reference image is matched to the target image based on the reference straight line, the matching straight line, the second straight line, and the second matching straight line, and a result of matching between matching the reference image and the target image is output.

6. The matching system of claim 5, wherein the geometrical shape generator is configured to update the reference search area again based on the third feature point and select a third straight line connecting the third feature point and a fourth feature point, which is closest to the third feature point, and then the candidate generator is configured to newly set a third matching candidate search area corresponding to the reference search area updated again and select a third matching straight line corresponding to the third straight line from the third matching candidate search area.

7. The matching system of claim 5, wherein the updated reference search area is the same as or different from the reference search area, and the second matching candidate search area is the same as or different from the matching candidate search area.

8. The matching system of claim 5, wherein an angle formed by the reference straight line and the second straight line and a length of the second straight line are respectively the same as an angle formed by the matching straight line and the second matching straight line and a length of the second matching straight line.

9. The matching system of claim 5, wherein the reference image is captured by an image capturing apparatus using a first sensor, and the target image is captured by the image capturing apparatus or another image capturing apparatus using a second sensor.

10. The matching system of claim 5, wherein the reference image is a visible image and the target image is a thermal image.

11. The matching system of claim 5, wherein, in order to search for the second matching straight line, the candidate generator is configured to generate a plurality of line segments between a plurality of feature points extracted from the second matching candidate search area, and
wherein one end and the other end of each of the line segments generated between the feature points extracted from the second matching candidate search area are a next feature point of the matching straight line and one of the feature points extracted from the second matching candidate search area, respectively.

* * * * *